United States Patent [19]

Smith

[11] 4,118,182
[45] Oct. 3, 1978

[54] SOLUTIONS OF AZO DYES DERIVED FROM 4-4-DIAMINO-2,2-STILBENEDISULFONIC ACID

[75] Inventor: Sanford Byrom Smith, Hockessin, Del.

[73] Assignee: E. I. Du Pont de Nemours and Company, Wilmington, Del.

[21] Appl. No.: 827,233

[22] Filed: Aug. 24, 1977

Related U.S. Application Data

[60] Continuation-in-part of Ser. No. 628,368, Nov. 3, 1975, abandoned, which is a division of Ser. No. 330,319, Feb. 7, 1973, abandoned.

[51] Int. Cl.² .............................. D06P 3/32; D06P 3/60; D21H 1/46
[52] U.S. Cl. ................................... 8/7; 8/13; 8/41 R; 8/50; 8/54.2; 8/172 R; 8/85 B; 8/85 R; 260/169; 260/173; 260/178; 260/184; 260/186; 260/187; 260/141; 260/144; 260/174; 162/162
[58] Field of Search ................ 260/175, 169–171, 260/178, 173, 174, 186, 184, 187; 8/85 R, 85 B, 41 R, 50, 54.2

[56] References Cited

U.S. PATENT DOCUMENTS

| | | | |
|---|---|---|---|
| 1,936,277 | 11/1933 | Straub et al. | 260/178 X |
| 2,489,463 | 11/1949 | Reynolds | 260/178 X |
| 2,490,703 | 12/1949 | Paige | 260/187 |
| 3,406,161 | 10/1968 | Dore et al. | 260/170 X |
| 3,600,376 | 8/1971 | Franklin | 260/175 |
| 3,621,008 | 11/1971 | Ross et al. | 260/175 |
| 3,681,320 | 8/1972 | Franklin | 260/175 |

FOREIGN PATENT DOCUMENTS

| | | | |
|---|---|---|---|
| 505,597 | 8/1954 | Canada | 8/85 |
| 318,623 | 1/1934 | Italy | 260/169 |
| 29-20,080 | 9/1964 | Japan | 260/178 |

OTHER PUBLICATIONS

"Outline of Snythetic Dyes", pp. 299 to 302, Mitsui Publishing Company (1968).
Colour Index, 3rd edition, vol. 4, p. 4281, #30120 (1971).

*Primary Examiner*—Floyd D. Higel

[57] ABSTRACT

Aqueous dye solution, useful for dyeing cellulosic and leather substrates, consisting essentially of, by weight:
 (i) 10% to 25% of at least one dye selected from the group

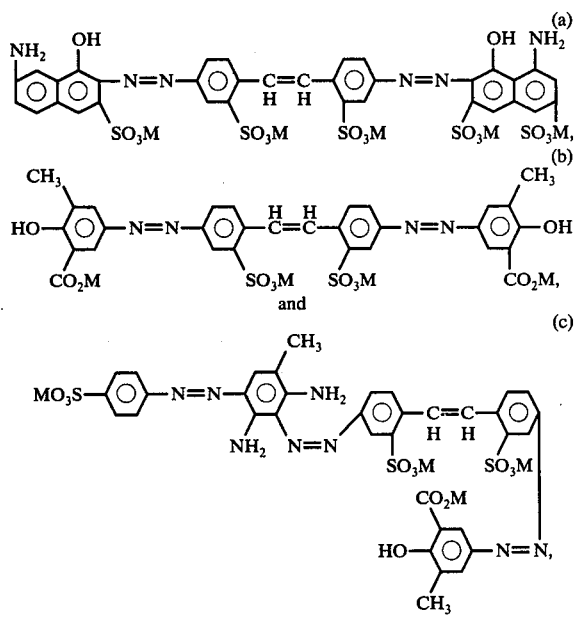

wherein M is a water-solubilizing cation;
(ii) 5% to 20% of urea; and
(iii) 55% to 85% of water.

10 Claims, No Drawings

SOLUTIONS OF AZO DYES DERIVED FROM 4-4-DIAMINO-2,2-STILBENEDISULFONIC ACID

CROSS-REFERENCE TO RELATION APPLICATIONS

This is a continuation-in-part application of copending U.S. Patent Application Ser. No. 628,368, filed on Nov. 3, 1975, now abandoned, which is a divisional application of copending U.S. Patent Application Ser. No. 330,319, filed on Feb. 7, 1973, now abandoned.

BACKGROUND OF THE INVENTION

1. Field of the Invention

This invention concerns aqueous solutions of dis- and tris-azo dyes prepared from diaminostilbenedisulfonic acid.

2. Description of the Prior Art

Various dyes have been made from diaminostilbenesulfonic acid. See, for instance, U.S. Pat. No. 2,489,463, German Pat. No. 55,648, and Japanese Pat. No. 20,080/64.

Regarding making dyes and producing commercial strength solutions by packaging an adjusted reaction mass, see U.S. Pat. No. 3,621,008, U.S. Pat. No. 3,600,376, U.S. Pat. No. 3,681,320. The processes of the latter two patents involve substitution of lithium or triethanolammonium ions in place of at least some of the usual sodium ions present in the diazotization and coupling masses involved. The dye processes of these patents are of the type A→B←C where B is 6,6'-ureylene-bis-1-naphthol-3-sulfonic acid.

U.S. Pat. No. 2,475,265 discloses isolation of the tetrazonium salt of 3,3'-dihydroxybenzidine. No dye solution is formed and the precipitated dye is separated by filtration.

SUMMARY OF THE INVENTION

This invention concerns aqueous dye solutions consisting essentially of the following components by weight:

(i) 10% to 25% of at least one dye selected from the group

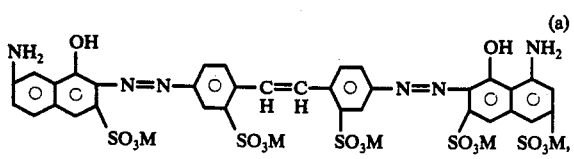
(a)

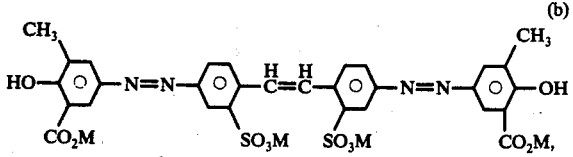
(b)

and (c)

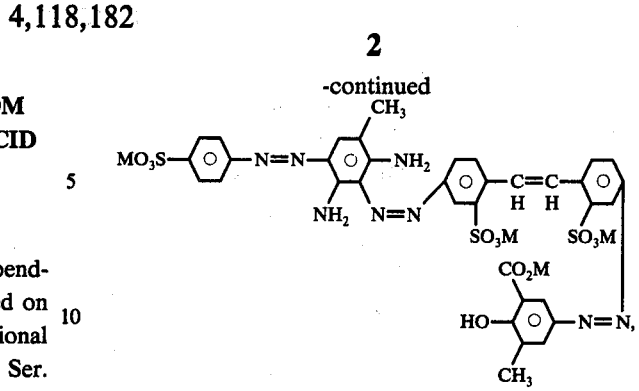

wherein M is a water-solubilizing cation;
(ii) 5% to 20% of urea; and
(iii) 55% to 85% of water.

The invention dye solutions are specifically meant to include solutions of single dyes as well as dye mixtures of two or more of the dyes designated above as (a), (b) and (c). By "consisting essentially of" is meant that no unspecified ingredients are included which interfere with the utility of the invention dye solutions. The water-solubilizing cation, M, can be the lithium cation, Li+, solely, or it can be a mixture of cations comprising the lithium cation and one or more of the triethanolammonium, diethanolammonium, diisopropanolammonium, and triisopropanolammonium cations.

The dye solutions of this invention are made by an improvement in the process of tetrazotizing diaminostilbenedisulfonic acid and reacting the reaction mass including tetrazonium salt with a coupling compound. The process for making the novel dye solutions is described more fully in my coassigned patent application bearing U.S. Ser. No. 330,319, entitled "Process For Making Azo Dyes Utilizing As An Intermediate The Isolated Tetrazonium Salt Of Diaminostilbenedisulfonic Acid". Briefly, the process is an improvement in a process for making a reaction mixture of tetrazonium salt of diaminostilbenedisulfonic acid and reacting this mixture with a coupler, the improvement comprising (i) isolating the tetrazonium salt after formation,
(ii) slurrying the isolated salt in water, and
(iii) reacting the slurry with at least one coupler selected from
1-amino-8-naphthol-3,6-disulfonic acid,
2-amino-8-naphthol-6-sulfonic acid,
2-hydroxy-m-toluic acid, and
2,4-diamino-5(4'-sulfophenylazo)toluene.

When acid couplers are described or referred to herein, the salts of said acids are also meant to be included in said description or reference.

The intermediate tetrazonium salt is water insoluble. When it is said that the salt is isolated, it is meant that the salt is obtained free of other reaction products and substantial amounts of impurities. The salt slurry in water is a new composition of matter allowing the process to be carried out with the formation of highly water-soluble dyes (in excess of 10%). It should be appreciated that "slurry" and "slurrying" is meant to include highly concentrated water-wet filter cakes of the tetrazonium salt.

Both inorganic and organic impurities are removed whem the tetrazonium salt is filtered, and when it is washed. Removal of inorganic impurities helps to provide more highly concentrated dye solutions since the impurities (salts), if not removed, tend to salt the dye out of solution. Removal of organic impurities promotes formation of dye of superior shade and fastness properties since the impurities, if not removed, also form dyes of undesired shade and properties.

DETAILS OF THE INVENTION

The basic compound used for preparing the described dyes is 4,4′-diamino-2,2′-stilbenedisulfonic acid (hereafter, for simplicity, referred to as DASDSA). The compound is prepared as is well-known in the art by first treating 4-nitrotoluene-2-sulfonic acid with alkali and hypochlorite to produce 4,4′-dinitrostilbenedisulfonic acid, then reducing the latter compound.

Tetrazotization of DASDSA is carried out (as is known in the art) by employing hydrochloric acid to furnish acidity and sodium nitrite as tetrazotizing agent. In fact, the tetrazotization step can be carried out in almost any known manner, since the product of this step is to be isolated before proceeding. Preferably, the tetrazotization is performed in aqueous hydrochloric acid at about 35° C., the nitrite being added over a period of 2 to 4 hours.

When tetrazotization is complete, all excess nitrous acid is removed by adding sulfamic acid and the solid tetrazonium salt is isolated by filtration. Excess water should be removed from the filter cake by suction or pressure so that the product is purified through removal of water soluble salts. Optionally, the filter cake can be washed with water to provide additional purification. Only a moderate amount of water wash is necessary since the impurities, largely sodium chloride, are very soluble and the product is very insoluble. Temperature during and after washing is not critical but is best kept between about 0° C. to 40° C. The tetrazonium salt from DASDSA can be preserved under these conditions for several weeks with negligible decomposition. Nevertheless, good practice dictates that the tetrazonium salt should be further processed promptly.

The tetrazonium salt is stable at temperatures below 50° C. It is a good practice to use the tetrazo product directly after it has been isolated. An aqueous slurry of good concentration of tetrazonium salt is prepared so that the final product is not too weak because of excess water. Preferably the slurry will contain at least about 40% of DASDSA tetrazonium salt. Normally, the tetrazo slurry will have a pH of from 2 to 4.

It is essential that the tetrazonium salt and the coupler come in intimate contact with one another for a proper dye-forming reaction. This is insured by preparing an aqueous solution or slurry of the coupler(s) for reaction with the DASDSA salt slurry. The coupling reaction can, additionally, be carried out in the presence of solubility aids such as alcohol, dimethylformamide or the like.

The coupling reaction is carried out by adding an aqueous slurry of the DASDSA tetrazonium salt to a solution or thin slurry of the coupler. For couplings which are best performed in an acid media, the procedure can be reversed, but best results are obtained with the procedure first noted. When the coupling is carried out on the acid side, for example, with naphthylamine-sulfonic acids as couplers, the dye product may be insoluble under the coupling conditions. It is thereafter dissolved by basifying the reaction mixture with a lithium base such as lithium carbonate or lithium hydroxide. Usually one mol of lithium base is employed for each mol of sulfonic acid group of the product. An alkanolamine such as triethanolamine can be employed as a buffer and solubilizing aid during the neutralization. Finally, pH is adjusted to about 8.5 to 9.5, and urea can be added to aid solution stability. Normally, the final standardized dye solution product will contain about 10%, based on solution weight, of urea.

Couplings are usually carried out on the alkaline side, and a slurry of the tetrazonium salt is added to a preformed solution of coupler or couplers. Couplers containing sulfonic acid or carboxylic acid groups are dissolved by neutralizing them in an aqueous slurry with a lithium base. Preferably, a solubilizing buffer such as triethanolamine or triisopropanolamine is also used to assist neutralization and solubilizing of the coupler. Where a buffer of this sort is used, it is normally used as the major neutralizing agent in an amount affording one mol of buffer for each mol of acidic groups on the coupler molecule. The lithium base is then used to adjust pH to the desired value, about 7 to 11.5.

Water is used in an amount sufficient to dissolve the coupler or couplers. An excess of water must be avoided in order to obtain a final dye solution of high concentration.

The tetrazonium salt slurry is added to the well-agitated coupler solution gradually over a controlled period of time, usually from 15 minutes to several hours. At the same time an aqueous solution of lithium base is added to the reaction mixture at the rate necessary to maintain the desired pH. Temperature as well as pH may be varied depending on the particular coupler or couplers used. Normally, pH is about 7.0 to 11.5 and temperature is between about 0° to 40° C. The desired pH should be maintained after all of the tetrazonium salt has been added by adding lithium base as necessary. When coupling is complete as indicated by a slight positive test for excess coupler — there should never be an excess of tetrazonium salt — pH is raised to at least 8.5 to 9.5 with additional lithium base. Solution stability is improved at the higher pH.

Sufficient urea is added after coupling to give a concentration of about 5% to 20% urea in the final product. At least part of the urea can be replaced by triethanolamine, triisopropanolamine, diethanolamine or diisopropanolamine, if desired. After addition of urea or additional alkanolamine the charge can be heated to about 75° C. to aid in final solubilization, then cooled and standardized to the desired strength by comparison with a known standard, and addition of water as required. The solution product can be filtered to remove any traces of insoluble matter that remain.

The dye solutions of the invention are most useful in dyeing paper, where the usual size and alum treatments are normally employed to aid in complete utilization of color. The substantivity of direct dyes for coloring paper can be tested by contacting paper slurry with dye in distilled or deionized water in the absence of size and alum, and comparing the amount of dye required to achieve the same color on the paper as when size and alum are used. In this test the dye solutions are at least about 50% substantive, some of them reaching 85% or 90%. Dyeing is normally carried out at ambient temperature and pH of about 4.2 to 5.5.

Dye solutions prepared by the above-described process can be mixed to form desired shades and colors. A full range of colors can be formed by suitable variation of couplers and mixtures, including black solutions of outstanding properties. All of the novel dyes are useful in the same way and can be used to dye cotton and leather in addition to paper. Paper can be dyed by adding the dye solution to a slurry of cellulose pulp. When using direct dyes, the dye is best added after the size but before the alum. Optimum pH is normally in the range of 4.0 to 6.0. Rosin sizing is commonly used, the amount depending on the use for which the particular type of paper is intended. The colored pulp is generally processed to paper in a Fourdrinier papermaking machine.

The dyes of the invention build up well on leather and give good fastness to washing. They are applied at near neutral pH. Chrome-tanned leather stock should be neutralized so that excess acidity in the dye bath is avoided.

The following Examples illustrate the invention. Parts and percentages are by weight unless indicated to the contrary. All of the theoretically possible dye structures are obtained when a mixture of couplers is employed. The couplers described herein as useful to make the claimed dye solutions have a purity of at least about 85% (dry weight basis). The remaining 15% consists of no more than about 3% by weight of coupler isomers, and no more than about 3% by weight of alkali metal salts, the remainder being primarily water of hydration. Larger amounts than about 3% of alkali metal salts will adversely affect the dye solution concentrations which are attainable.

EXAMPLE 1

This Example concerns making the following dyes wherein M is the solubilizing cation, lithium or triethanolammonium.

with water. The isolated filter cake consisted of 42 parts of wet cake containing 80% solid product. In preparation for the coupling step, 28.0 parts of the wet cake (22.4 parts of 100% solid, 0.057 mole) was slurried in 18 parts of water at 20° to 25° C. The pH of the slurry was 3.5.

Preparation of Coupler Solution

Into another vessel there was charged 90 parts of water and 17.7 1 parts of 99% triethanolamine. With good agitation there was then charged 15.05 parts of 2-amino-8-naphthol-6-sulfonic acid (94%, 0.0592 mole, 14.15 parts of 100%) and 22.7 parts of 1-amino-8-naphthol-3,6-disulfonic acid (89%, 0.0592 mole, 20.2 parts of 100%), with temperature at about 30° C. After the reaction mass was uniformly mixed, pH was adjusted to about 7.5 by adding the required amount of 15% aqueous lithium hydroxide monohydrate solution. The charge was then stirred at 30° C. and 7.5 pH for 2 hours to effect complete solution.

Coupling

Coupling was performed at 30° to 35° C., using external cooling. A slow stream of the 15% lithium base solution and the prepared tetrazonium salt slurry were added simultaneously to the coupler solution, the pH being maintained at 7.5 ± 0.3 by adjusting the rate of the two streams. Complete addition of the tetrazonium salt occupied about 1 hour. After stirring for an addi-

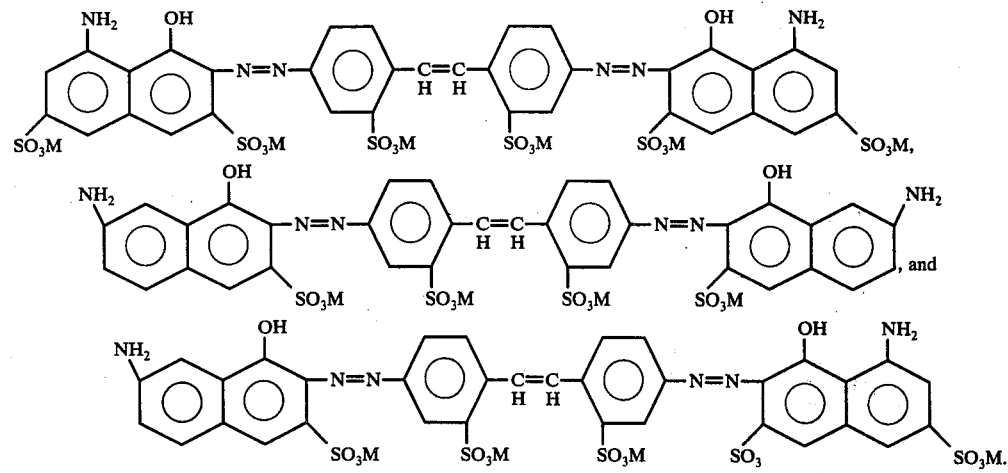

Preparation of the Tetrazonium Salt of DASDSA Slurried in Water

In a suitable vessel 32.4 parts (0.0875 mole) of DASDSA was thoroughly mixed with 170 parts of water to obtain a thin, uniform yellow slurry. To the slurry was added 27.5 parts of 31% aqueous hydrochloric acid (0.234 mole) over a 1½ hour to 2 hour period, at a uniform rate. The temperature of the reaction mass rose slightly, and was adjusted by external cooling to about 35° C. With the temperature at about 35° C., 43.8 parts of 31.5% aqueous sodium nitrite solution (0.199 mole) was gradually added over a period of about 3 hours. At the end of the diazotization there was a slight excess of nitrous acid and the mass was strongly acidic. The nitrous acid excess was decomposed just before filtration by adding a small amount of sulfamic acid. The slurry was then filtered to isolate the insoluble tetrazonium salt product, and the filter cake washed tional half hour there remained a slight amount of unreacted coupler. The pH was then raised to about 8.8 by adding a small amount of dry lithium hydroxide monohydrate. Finally, 25 parts of urea was added as solution stabilizer, and the charge was heated to 70°-75° C. for an hour and cooled to 25° C.

The charge was sampled and tested for shade and strength against a known standard and strength adjusted by adding water. There were obtained 250 parts of blue dye solution suitable for dyeing paper, cotton or leather. The solution contained 44 parts of active dye as indicated by spectrophotometric determination of the color value. This represents a yield of 80% of the theoretical color value, based on the parts of diaminostilbenedisulfonic acid used.

EXAMPLE 2

The dye is

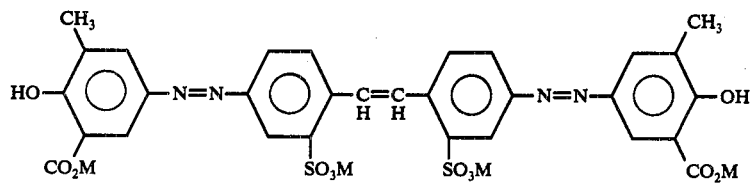

wherein M is the solubilizing cation, lithium.

Preparation of Tetrazonium Salt Slurry

The slurry vessel was charged with 14.0 parts of water and 6 parts of ice, and 14.0 parts of the tetrazonium salt filter cake (0.0285 mole) prepared as described in Example 1. The temperature of the smooth slurry was 5° C. and the pH was 3.5.

Preparation of Coupler Solution

Into the coupling vessel was charged 20.0 parts of water and 2.25 parts of lithium hydroxide monohydrate. After 15 minutes of stirring, solution was complete. There was then added gradually, over about 30 minutes, 9.0 parts of 2-hydroxy-m-toluic acid (o-cresotinic acid) (100%, 0.06 mole) with good stirring to effect almost complete dissolution. Sufficient lithium hydroxide monohydrate was added (about 1 part) to bring the pH to about 10.3, forming a clear solution. The solution was cooled to 0° to 2° C. by adding 10 parts of ice.

Coupling

The tetrazonium salt slurry was added to the cresotinic acid coupler solution at a uniform rate over a 3 hour period, while simultaneously adding 15% aqueous lithium hydroxide monohydrate solution at a rate to maintain pH in the reaction mass at about 10. The temperature was not allowed to go above 30° C., about 5 parts of additional ice being added to keep it below that level. When addition of tetrazonium salt was complete, stirring at about 20° C. was continued for another hour. At completion of the coupling a slight excess of coupler remained in the reaction mass.

The charge was sampled and tested for strength and shade against a known standard. Strength was adjusted by adding water. Final yield was 120 parts of yellow dye solution containing 16.0% active dye ingredient as determined by spectrophotometric analysis. This represents a yield of 95% based on the parts of DASDSA used.

EXAMPLE 3

The trisazo dye made in this Example is

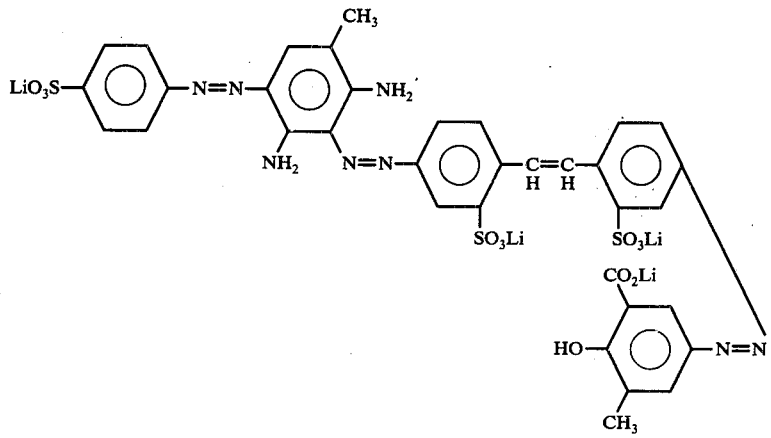

The first step involved the diazotization of sulfanilic acid and coupling to 2,4-diamino toluene to form the familiar azo compound 2,4-diamino-5(4'-sulfophenylazo)-toluene. The procedure is analogous to the well-known procedure disclosed on page 287 of Fierz-David and Blangey "Fundamental Processes of Dye Chemistry", published 1949 by Interscience Publishers, Inc. New York, N.Y.

An equimolar quantity of the azo compound was slurried in water with cresotinic acid and pH raised to 10.0 by adding lithium hydroxide monohydrate. An aqueous slurry containing an equivalent amount of DASDSA tetrazonium salt (as in Example 1) was added at 20° to 30° C. and pH 10 to 11 over about 15 minutes. The charge was stirred for an additional hour to complete the reaction. The total reaction mass was diluted with water to 13% active ingredient dye as measured by spectrophotometer on the basis of an established standard, and 20% of the total weight of urea was added and dissolved. The brown dye solution was filtered through cloth.

The embodiments of the invention in which an exclusive property or privilege is claimed are defined as follows:

1. The aqueous dye solution consisting essentially of the following components by weight:
   (i) 10% to 25% of at least one dye selected from the group

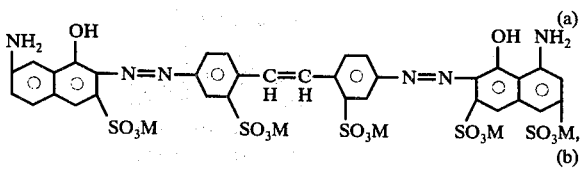

-continued

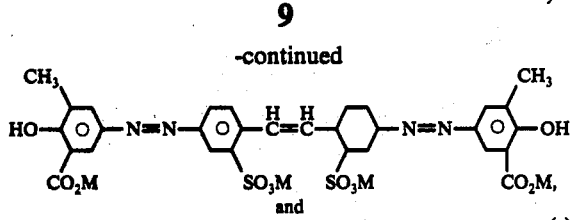
and

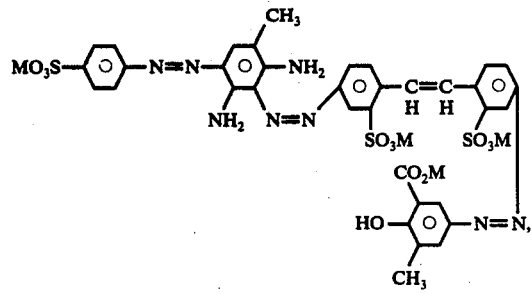

wherein M is a water-solubilizing cation;
(ii) 5% to 20% of urea; and
(iii) 55% to 85% of water.

2. The aqueous dye solution of claim 1 wherein M is selected from the group consisting of lithium cation, and lithium cation plus a cation selected from triethanolammonium, diethanolammonium, diisopropanolammonium, and triisopropanolammonium cations.

3. The aqueous dye solution of claim 2 wherein M is the lithium cation.

4. The aqueous dye solution of claim 2 wherein the dye is

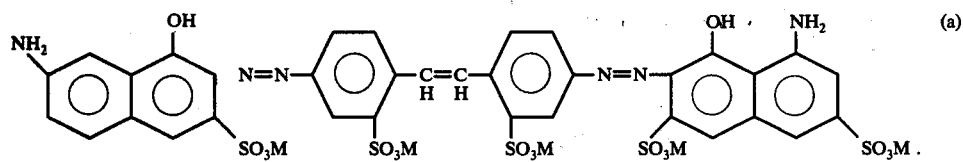

5. The aqueous dye solution of claim 2 wherein the dye is

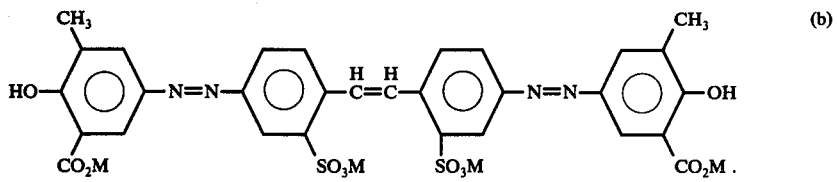

6. The aqueous dye solution of claim 2 wherein the dye is

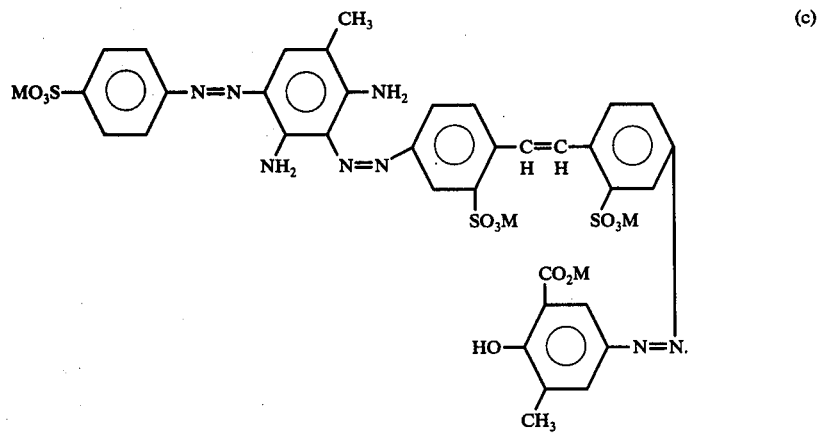

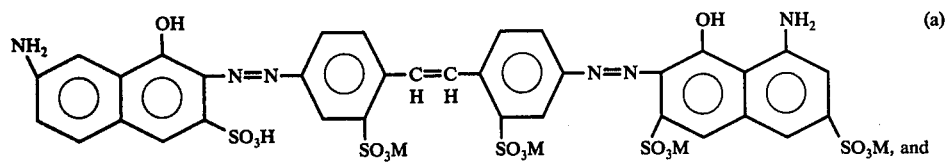

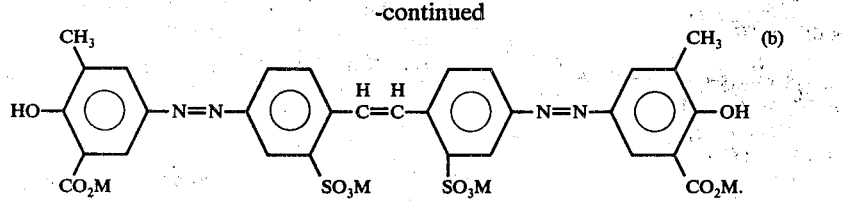
8. The aqueous dye solution of claim 2 wherein the dye is
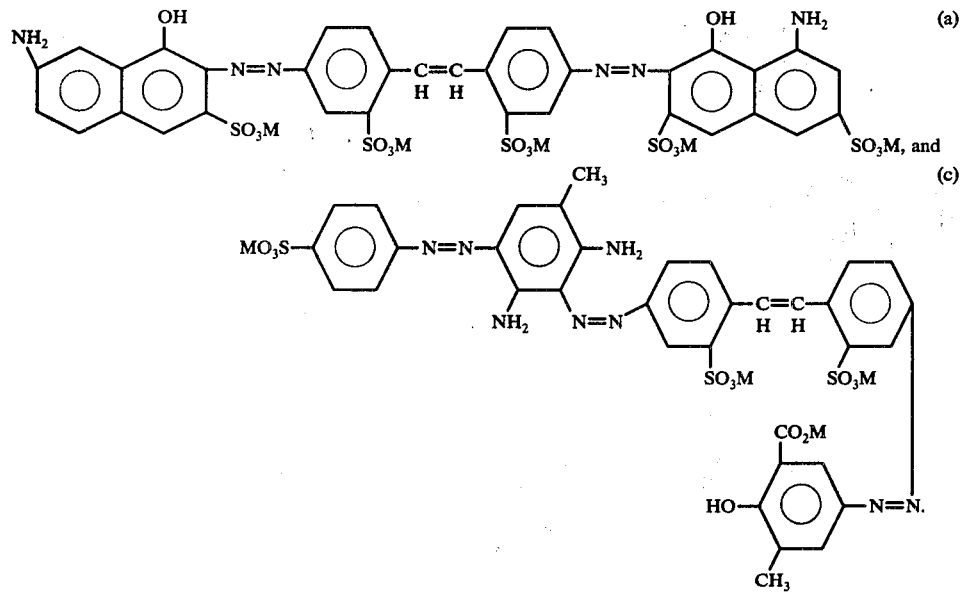
9. The aqueous dye solution of claim 2 wherein the dye is
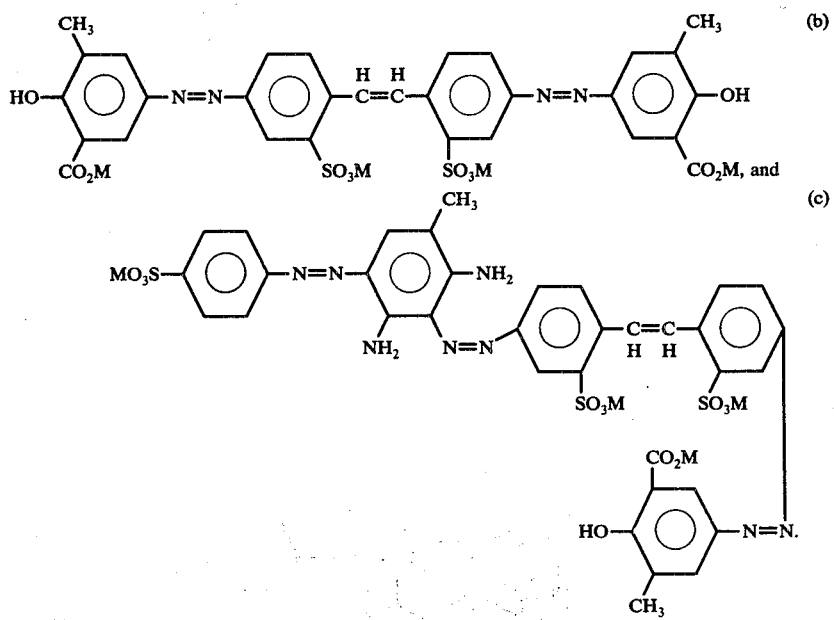

10. The aqueous dye solution of claim 3 wherein the dye is
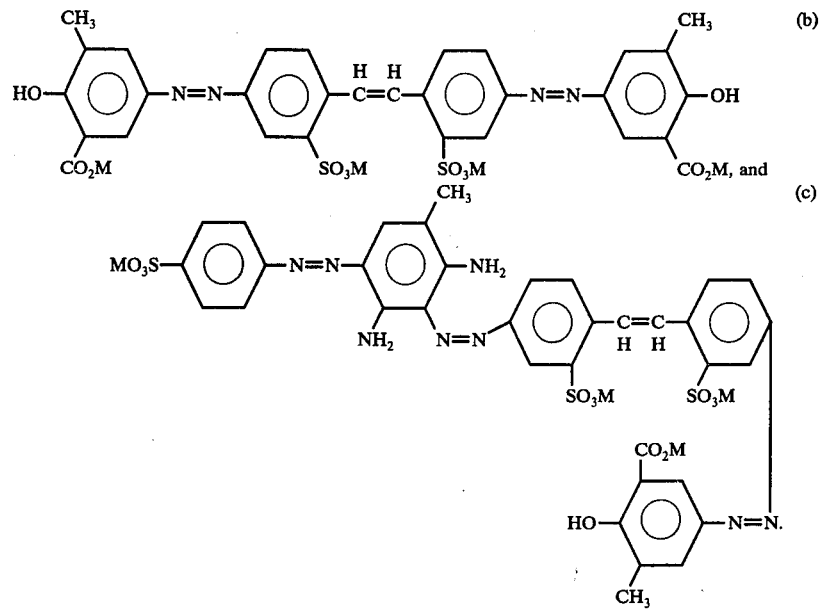

7. The aqueous dye solution of claim 2 wherein the dye is